United States Patent
Anderson, Jr. et al.

(10) Patent No.: US 7,437,609 B2
(45) Date of Patent: *Oct. 14, 2008

(54) RELIABLE STANDBY DATABASE FAILOVER

(75) Inventors: Richard James Anderson, Jr., Nashua, NH (US); Barbara A. Benton, Auburn, NH (US); William Havinden Bridge, Jr., Alameda, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/325,082

(22) Filed: Jan. 3, 2006

(65) Prior Publication Data

US 2006/0179347 A1 Aug. 10, 2006

Related U.S. Application Data

(63) Continuation of application No. 10/154,116, filed on May 22, 2002, now Pat. No. 7,003,694.

(51) Int. Cl.
*G06F 11/00* (2006.01)

(52) U.S. Cl. .......................................... 714/20; 714/16

(58) Field of Classification Search ................... 714/16, 714/20
See application file for complete search history.

(56) References Cited

U.S. PATENT DOCUMENTS

| | | | |
|---|---|---|---|
| 5,379,418 A | 1/1995 | Shimazaki et al. | 395/575 |
| 5,594,900 A | 1/1997 | Cohn et al. | 395/600 |
| 5,907,848 A | 5/1999 | Zaiken et al. | 707/202 |
| 6,065,018 A * | 5/2000 | Beier et al. | 707/202 |
| 6,292,808 B1 * | 9/2001 | Obermarck et al. | 707/202 |
| 6,691,139 B2 | 2/2004 | Ganesh et al. | 707/204 |
| 6,732,123 B1 | 5/2004 | Moore et al. | 707/202 |
| 7,024,420 B2 * | 4/2006 | Ball et al. | 707/102 |
| 2003/0126133 A1 * | 7/2003 | Dattatri et al. | 707/10 |

* cited by examiner

*Primary Examiner*—Scott T. Baderman
*Assistant Examiner*—Paul F Contino
(74) *Attorney, Agent, or Firm*—Perman & Green, LLP (57) ABSTRACT

A method for providing data integrity of a database system. A standby database is selected to replace a failed primary database. At least one redo log file having at least one data transaction is selected to be applied to the selected standby database. The selected standby database is updated with the data transaction from the selected redo log file if an identification code in the redo log file matches an identification code in the standby database.

21 Claims, 6 Drawing Sheets

RELIABLE STANDBY DATABASE FAILOVER

CROSS-REFERENCE TO RELATED APPLICATIONS

This application is a continuation of U.S. patent application Ser. No. 10/154,116 filed on May 22, 2002 now U.S. Pat. No. 7,003,694.

BACKGROUND OF THE INVENTION

1. Field of the Invention

The present invention relates to database processing and, more particularly, to providing data integrity during a database failover.

2. Brief Description of Related Developments

Database systems often include a primary database and backup, or standby, databases. The standby databases can be located locally or remotely relative to the primary database. Log files are associated with each of the primary and standby databases to preserve the integrity of the data in the database system. Generally, log files are used to record data transactions applied to the primary database, so that if the primary database is damaged in some way, the log files can be used to restore the damaged or missing data to the standby database.

In a database system configuration containing the primary database and the standby database, and the standby database is recovered by applying archived redo log files from the primary database, the standby is always at least one log file behind the primary. The primary's redo data is written to the primary database's redo log file and the standby database's redo log file, and then the modifications are written to the primary database's data files. A new primary log file is begun when the primary redo log file becomes full, or as a result of a command quicker failover. Terminal recovery of the present invention can overcome the loss of data integrity in a primary database caused by an apparent failure of the primary database, and can provide a deterministic standby database recovery solution in the event of failure of the primary database. Terminal recovery can be applied to any product providing a disaster recovery solution utilizing a standby database which needs to guarantee reliable and consistent fail-over methodologies. This includes many database systems having standby databases and disaster recovery products.

Figure 2:
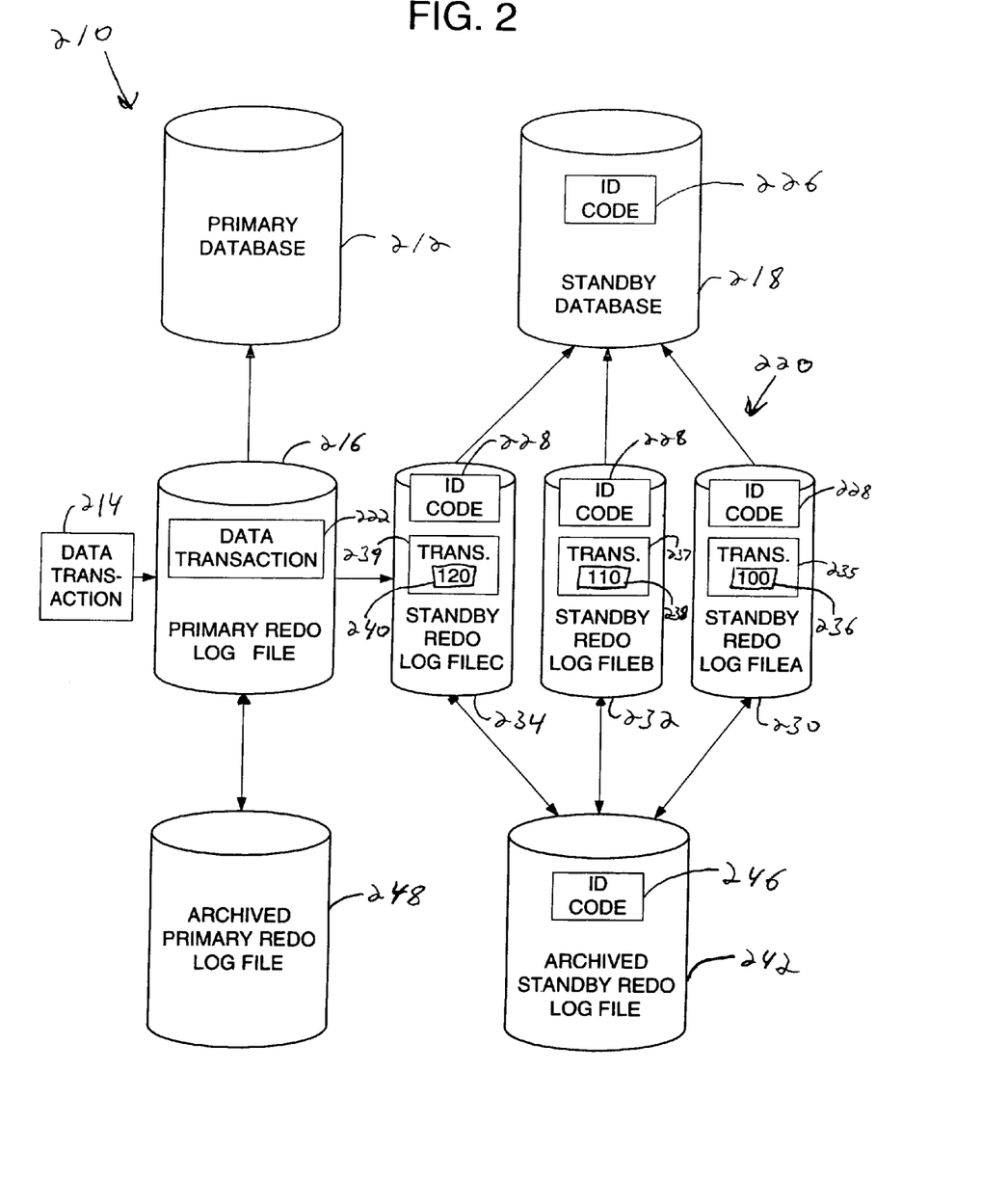
FIG. 2 is a block diagram of another embodiment of a database system including a terminal recovery system.

In one embodiment of terminal recovery, separate steps for applying terminal recovery have been shown. In another embodiment, terminal recovery automatically creates, records and inserts a unique identification code 226, 228 in the appropriate files, updates the standby database 220, and creates an archived redo log file 242 after an instruction to initiate terminal recovery is issued by a user.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims. issued by a database administrator (DBA). After such a primary log file switch takes place, the primary redo log file is archived both locally for the primary database and to the standby site for the standby database. The archiving can be done in parallel with the primary log file switch, if desired. However, the archived primary redo log file can't be applied until the primary log file switch occurs.

An apparent failure of the primary database may be caused by hardware problems, software problems, or loss of communications with the primary database site. In the event of failure of the primary database, the standby database will not be able to recover any redo transaction data contained in the primary database's redo log files as the primary database and associated log files are most likely unavailable due to the failure. The standby database is guaranteed to have a data loss, which could potentially be very large if the primary database's online logs were large and nearly full.

When a database suffers a catastrophic failure, and the data on the primary database is no longer considered accessible, a failover procedure can be used to replace the primary database with a standby database associated with the primary database. When executing a failover procedure, it is often essential that a transfer from one database to another database take place quickly. Essential business could be put on hold or lost while the database system is down. The switchover to a standby database should take place quickly. If the failover procedure fails, a manual recovery of one of the standby databases may be required. A manual recovery of a standby database is very manual-intensive and highly prone to incorporate human caused errors.

To provide some additional data security, some database systems use write-ahead logging. In write-ahead logging, transactions which are to be written on the primary database are first written to the primary database's online redo log files. The transactions are also transmitted either synchronously or asynchronously to the standby database's online redo log files. The contents of the redo log files are applied to the primary database only after the data has been successfully logged in both the primary database's current redo log files and standby database's current redo log files. Redo logs are archived once all the transactions in the redo logs have been written to the associated database.

During a failure of the primary database, the last transaction transmitted to standby redo log files may or may not have been written to disk at either the primary database or the standby database. Therefore, the standby redo log file may have more or less redo transactions than the primary redo log file. The use of synchronous transmission minimizes the possible difference of what was written to the primary and standby redo log files at the time the primary failed. However, it is impossible to guarantee that transmission occurred for all elements of a transaction, i.e. atomically, for both the primary and standby redo log files. The following table shows 3 possible cases of 2 transactions, A and B, simultaneously being written to the primary and standby redo log files when a failure occurs.

|        | Primary | Standby |
|--------|---------|---------|
| Case 1 | A, B    | A       |
| Case 2 | A       | A, B    |
| Case 3 | A, B    | A, B    |

In case 1, the primary redo log file includes both transactions A and B, while the standby redo log includes only transaction A. If a redo is done with the primary redo log file, both transaction A and B will be applied, or possibly reapplied, to the primary database. A redo implemented with the standby redo log file will not apply transaction B. Therefore, the primary and standby databases will not have the same data.

In case 2, transaction B was successfully written to the standby redo log but not to the primary redo log. A redo implemented with the primary redo log file will not apply transaction B to the primary database, while a redo with the standby redo log will apply transaction B to the standby database. In case 3, both the primary and standby redo logs have the same transactions, so both the primary and standby databases will be consistent with each other after a redo is done.

As shown, depending upon the timing of the failure of the primary database, the transactions logged in the various log files may be different for each database in a database system. In order to begin the failover process, the DBA can select which redo log(s) are to be used for the redo procedure, and can also select which standby database, if there are more than one, is to be used for the redo procedure.

Once a log file has begun to be used to update a database, the update process should continue to a conclusion. A recovery should not restart using different redo log files because the current redo log files could be different between the primary and standby depending on the state of the transmission when the primary failed, as shown in the three cases. The last part of a redo could be in the primary's current redo log file but not written to the standby's redo log file before the primary failed. Moreover, the redo could have been written to the standby where it will be applied, but the primary failed before the acknowledgment was received at the primary.

In addition, the DBA may attempt to update the database with log files from different sources, as different log files can contain different transactions. However, a multiple log file update can cause serious database data integrity problems, as transactions may be applied multiple times. A transaction can often affect a number of database records and fields. Once the data in a database can no longer be relied upon, manual intervention is required to examine the data and transactions in the database to determine what data fields must be adjusted, which transactions must be backed out and which transactions are to be added. This manual recovery of a database is requires a large number of man hours, is very time consuming, and is highly prone to the creation of additional errors in the database and the log files, and therefore is to be avoided.

Existing systems are able to determine that a problem with a database exists after a database has been corrupted by an update. However, once the problem, such as with data integrity, has been determined, a great deal of time and manual effort is required to fix the database. Existing systems cannot guarantee that data integrity will be preserved in all fail-over and recovery scenarios. It would be advantageous to have a method for preventing such database updates before they occur, and prevent the need for a manual standby database recovery.

SUMMARY OF THE INVENTION

The present invention is directed to a method for providing data integrity of a database system. In one embodiment, the method comprises selecting a standby database to replace a primary database. At least one redo log file having at least one data transaction is selected to be applied to the selected standby database. The selected standby database is updated with the data transaction from the selected redo log file if an identification code in the selected redo log file matches an identification code in the selected standby database.

In another aspect, the present invention is directed to a computer-readable medium carrying one or more sequences of instructions for providing data integrity of a database system. In one embodiment, execution of the one or more sequences of instructions by one or more processors causes the one or more processors to provide a primary database and at least one associated primary log file, and at least one standby database and at least one associated standby log file.

The computer-readable medium also includes sequences of instructions causing the processors to select the standby database to replace the primary database, and select at least one redo log file from the primary log file or from the at least one standby log file. The selected redo log file has at least one data transaction for applying to the selected standby database. The sequence of instructions also causes the processors to update the selected standby database with the data transaction from the selected redo log file if an identification code in the redo log file matches an identification code in the standby database.

In a further aspect, the invention includes a system for providing data integrity of a database system. In one embodiment the system comprises a primary database and at least one associated primary log file, and at least one standby database and at least one associated standby log file. At least one standby database is adapted to be selected for replacing the primary database. The system includes a redo log file having at least one data transaction to update the selected standby database. The redo log file is adapted to be selected from the primary log file or one of the at least one associated standby log file.

The system further includes an identification code that is inserted into the selected standby database and into the redo log file in order to associate the selected redo log file with the selected standby database. The data transaction from the redo log file is applied to the selected standby database only if an identification code in the selected redo log file and an identification code in the selected standby database match. The matching of the identification code of the selected standby database and the selected redo log file is adapted to prevent an update to the selected standby database with another log file that does not include the identification code, or has a different identification code.

In a further aspect, the invention includes a system for providing for data integrity of a database system. In one embodiment, the system comprises means for selecting a standby database for replacing a primary database, and means for selecting at least one redo log file having at least one data transaction for updating the standby database. The system also includes means for uniquely associating the redo log file with the selected standby database, and means for applying the data transaction from the selected log file to the selected standby database only if the redo log file and the selected standby database include the means for uniquely associating the selected log file with the selected standby database, wherein matching of the means for uniquely associating provides for data integrity of the selected standby database by preventing an update to the selected standby database with another log file which does not include the means for uniquely associating the selected log file with the selected standby database.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT(s)

Figure 1:
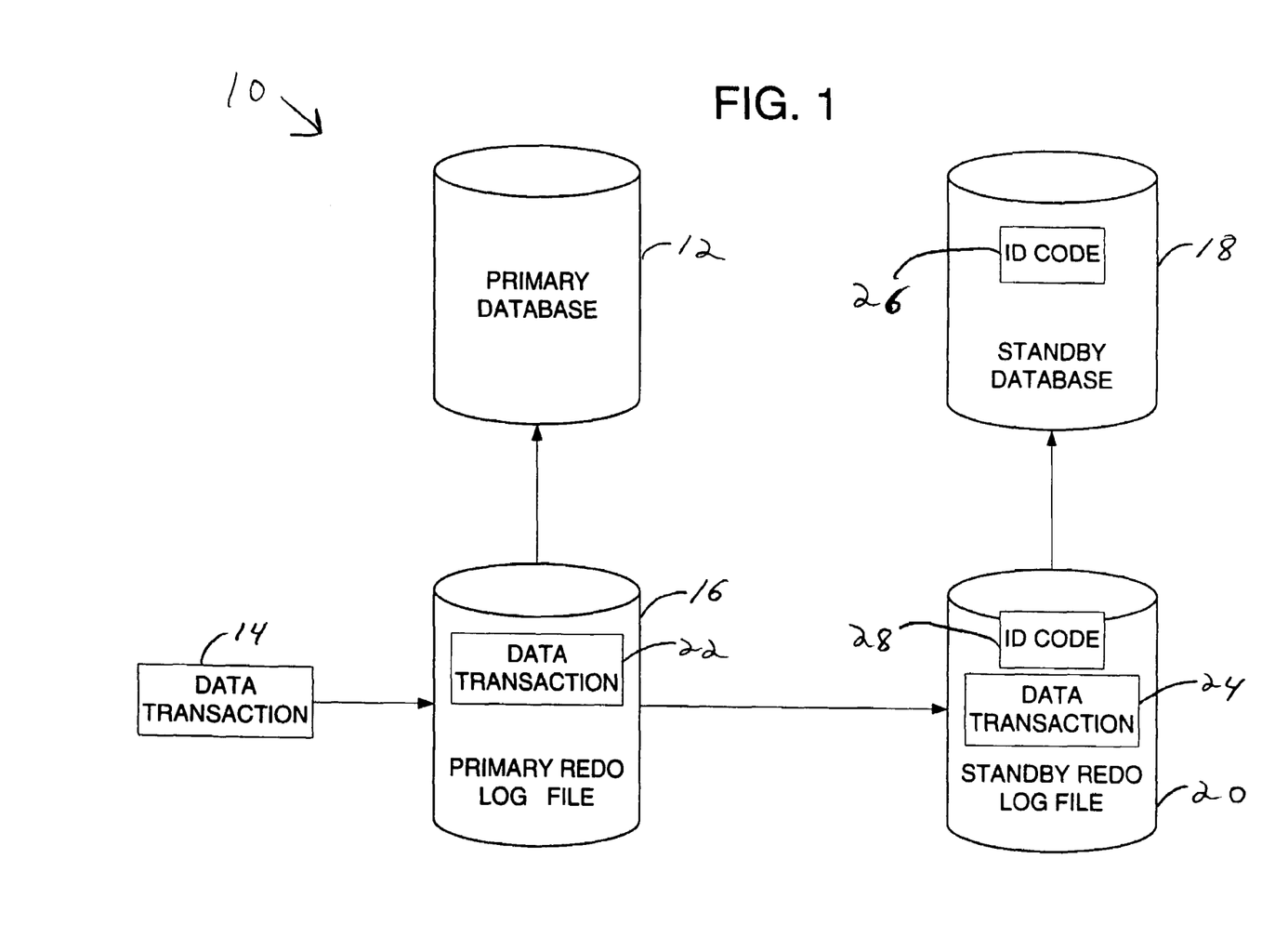
FIG. 1 is a block diagram illustrating one embodiment of a database system including a terminal recovery system incorporating features of the present invention.

Referring to FIG. 1, a block diagram view of a system 10 incorporating features of the present invention is illustrated. Although the present invention will be described with reference to the embodiments shown in the drawings, it should be understood that the present invention can be embodied in many alternate forms of embodiments. In addition, any suitable size, shape or type of elements or materials could be used.

The present invention generally provides terminal recovery of a database during a failover. For the purpose of explanation, embodiments of the invention shall be described in the context of a database system having at least one standby database and redo logs. The present invention is not limited to any particular type of database system, or any particular form of data containers for the base or summary data.

As shown in FIG. 1, the database system 10 generally comprises a primary database 12 for receiving data transactions 14. Associated with the primary database 12 is a primary redo log file 16 for recording data transactions 14 to be posted to the primary database 12. The database system 10 also includes one or more standby databases 18 for backing up the data stored or posted in the primary database 12. For illustration purposes, only one primary database 12 and one standby database 18 is shown. A standby redo log file 20 is associated with each standby database 18 for recording data transactions to be posted to the standby database 18. The redo logs 16, 20 are files containing redo data transactions 14. Each redo data transaction 14 describes a change or a set of atomic changes to the database 12, 18. The redo logs 16, 20 do not always contain the same transaction 14 because of network or system failure.

During terminal recovery, the primary database 12 is unavailable and access to transaction data in the primary database is replaced with access to transaction data in a selected standby database 18. The selected redo log files 16, 20 can be applied to the standby database 18. The selected standby database 18 is updated with selected redo log file 16, 20 if an identification code 28 in the selected redo log file 16, 20 matches an identification code 26 in the selected standby database 18. The application of the selected redo log file 16, 20 is the end of the recovery process because there are no further redo log file data transactions 14 available to apply against the standby database 18. After terminal recovery, the standby database 18 can be opened in read only mode or converted to become a new primary database. Other standby databases (See FIGS. 3 and 4) in the database system 10 do not need to be re-created. The standby redo log file 20 is archived after terminal recovery, and the archived standby redo log file 20 may be applied to the other standby databases to bring them to a consistent state with the new primary database 18.

Terminal recovery provides a deterministic standby database recovery solution in the event of failure of the primary database 12. The database system 10 design allows a database administrator (DBA) to determine components, such as the log files 16, 20 and the databases 12, 18, used in a standby database failover procedure. Terminal recovery can guarantee that these components will be the components used for the failover procedure in the future. Other log files cannot be used for terminal recovery after the redo log file 16, 20 to be used in terminal recovery is selected. This is true even if terminal recovery is restarted, or the DBA decides to use different log files. This is a highly advantageous design for a failover procedure, in that the integrity of standby databases 18 can be guaranteed in all failover situations.

Referring to FIG. 1, the database system 10 utilizes write-ahead logging for data integrity purposes. Therefore, the data transactions 14, 22, 24 are written to the primary redo log file 16 and the standby redo log file 20 before the data transactions 14 are written to the primary database 12. The use of write-ahead logging, and most other types of database updating, can generate inconsistent data between the primary redo log file 16 and the standby redo log file 20.

In alternate embodiments, terminal recovery can be applied to a database system 10 in which data transactions 14 are written directly to the primary database 12, or the primary database 12 and standby database 16 are updated in any other manner, without departing from the broader aspects of the present invention. These methods of updating databases and log files can also generate inconsistent data between the primary redo log file 16 and the standby redo log file 20. Terminal recovery can preserve data integrity during a failover procedure regardless of the type of database updating.

As shown in FIG. 1, the identification code 26, 28 is inserted in the selected standby database 18 and the selected redo log file 20. The identification code 26, 28 is generated and applied to both the selected standby database 18 and the selected redo log file 20 in order to associate the selected standby database 18 with the selected redo log file 16, 20. The identification code 26, 28 can be stored in the standby database 18 and standby redo log file 20.

Once it has been determined that the primary database 12 has failed, such as by encountering a catastrophic failure, a user can initiate a terminal recovery process incorporating features of the present invention on the standby database 18. In another embodiment, terminal recovery can be automatically initiated without departing from the broader aspects of the present invention. A catastrophic failure of the primary database 12 means that the primary database is unavailable, usually due to database failure, or a telecommunications failure with the primary database 12. The user can be a DBA, or other person responsible for the database system 10. When the user decides that a failover is necessary, the standby database 18 will be used to replace the unavailable primary database 12.

Figure 5:
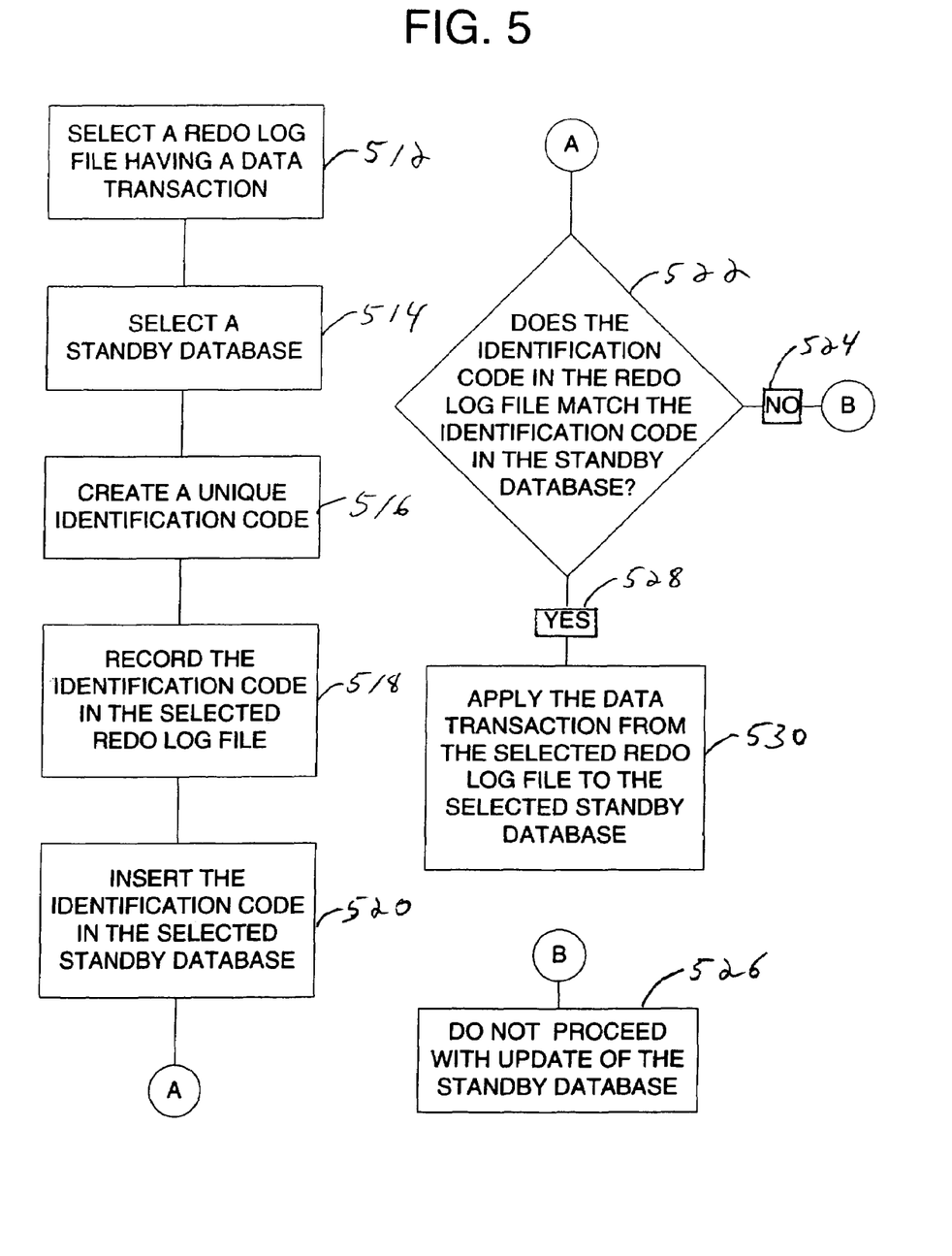
FIG. 5 is a flowchart illustrating an embodiment of a method incorporating features of the present invention.

Referring to FIG. 5, and in a step 512, the DBA selects one of the redo log files 16, 20 having at least one data transaction record 24 to be applied to the standby database 20. Generally, the standby redo log file 20 is selected. In alternate embodiments, the user may choose to apply the primary redo log file 16 instead of the standby redo log file 20. In that case the user must copy the primary redo log file 16 to the standby redo log file 20, thus replacing the standby redo log file 20. Only one redo log file 16, 20, either the primary redo log file 16 or the standby redo log file 20, but not both, will be subsequently applied to the standby database 18. If the primary database 12 is not available, the primary redo log file 16 may also be unavailable to be selected as the redo log file 16, 20.

The selection of one of the redo log files 16, 20 can be based on which log file 16, 20 in the database system has the most up-to-date transaction data 22, 24. The selection could also be based on which log file 16, 20 has the most correct transaction data 24, or some other selection criteria could be used, without departing from the broader aspects of the present invention.

Continuing to refer to FIG. 5, and in a step 514, the standby database 18 to be used in terminal recovery is selected. If multiple standby databases are available, the selection of the standby database 18 can be based on which database in the database system 10 has the most up-to-date transaction data 22, 24. In another embodiment, the selection could be based on which database has the most correct transaction data 22, 24, or some other selection criteria could be used, without departing from the broader aspects of the present invention.

As shown in FIGS. 1 and 5, and in a step 516, the unique identification code 26, 28 is created, and in a step 518, recorded in the selected redo log file 20, and in a step 520, inserted into the selected standby database 18. Referring to FIG. 5, and in a step 522, before the data transactions 24 in the selected standby redo log file 20 are applied to the selected standby database 18, the identification code 26 in the selected standby database 18 is compared with the identification code 28 in the selected standby redo log file 20. If the identification codes 26, 28 match 528, in a step 530, the data transactions 24 from the selected standby redo log file 20 are applied to the selected standby database 18. If the identification codes do not match 524, in a step 526, the standby database 18 is not updated.

Referring to FIG. 2, one embodiment of a database system 210 incorporating features of the present invention includes a standby redo log file 220 which can be a redo log file configuration 220 comprising a plurality of data files, such as standby redo log fileA 230, standby redo log fileB 232, and standby redo log fileC 234. The selection of the standby redo log file configuration 220 implicitly includes all of the standby log data files 230, 232, 234. In another embodiment, a primary database 212 and a standby database 218 can also include multiple database data files (not shown) without departing from the broader aspects of the present invention. A database data file is a physical operating system file on a disk created by a database server containing data structures such as tables and indexes. A database data file can only belong to one database. In a further embodiment, a primary redo log file configuration 216 can also comprise multiple primary redo log data files (not shown), in the same manner as the standby redo log file configuration 220 includes multiple redo log data files 230, 232, 234, without departing from the broader aspects of the present invention.

Continuing with FIG. 2, each redo log data file 230, 232, 234 can store at least one data transaction 235, 237, 239. Each data transaction 235, 237, 239 is assigned a transaction number 236, 238, 240 as the data transaction 214 is written and committed to the redo log file 216, 230, 232, 234. A transaction number 236, 238, 240 is a stamp that defines a committed version of a database 212, 218 at a point in time. Every committed transaction 235, 237, 239 is assigned a unique transaction number 236, 238, 240.

Referring to FIG. 2, an identification code 228, such as a Terminal Recovery Stamp (TRSTAMP) code 228, can be used to identify the operation of closing out the redo log files 216, 220. The identification code 226, 228 can uniquely identify the selected redo log file configuration 220 and selected standby database 218 that are participating in terminal recovery. The identification code 228 is generated at the initiation of the terminal recovery and can include the lowest transaction number 236 in the selected redo log files 230, 232, 234.

For example, FIG. 2 shows that the lowest number 236 of the data transactions 235 in standby redo log fileA 230 is transaction number 100, the lowest number 238 of the data transactions 237 in standby redo log fileB 232 is transaction number 110, and the lowest number 240 of the data transactions in 239 in standby redo log fileC 234 is transaction number 120. The identification code 226, 228 can also include recognition code, such as a timestamp. The timestamp can be the initiation time of terminal recovery.

As shown in FIG. 2, the lowest transaction number 236 in the selected standby redo log configuration 220 is transaction number 100. The inclusion of the lowest transaction number 236 in the identification code 226, 228, provides an indication of the earliest data transaction 235 which will be applied against the selected standby database. The combination of the lowest transaction number 236 and the timestamp provide a unique identification code. The same unique identification code 226, 228 is applied to all redo log files 230, 232, 234, and inserted in all data files (not shown) comprising the selected standby database 218. Once the selected redo log files 230, 232, 234 have been tagged with the identification code 228, those redo log files 230, 232, 234 differ from all other standby log files 216. While an identification code 226, 228 including the lowest data transaction number 236 and the current timestamp has been shown and discussed, the present invention is not so limited, as the identification code 226, 228 can be any indicator which can be used for unique identification of files 212, 216, 218, 220, 246 against which the identification code 226, 228 can be applied.

Referring to FIG. 2, before initiation of the terminal recovery process of the present invention, any unrecovered complete log files 242 can be applied to the standby database 218. The archived primary redo log file 248 can also be applied to the standby database 218. Terminal recovery is initiated when the partial redo log file configuration 220 is processed. After the updating of the selected standby database 218 is completed, the redo log file configuration 220 that is used for the updating is archived. The archived standby redo log file 242 includes the identification code 246 which is the same as the identification code 228 in the redo log file configuration 220. Archived log files 242, 248 are write-once and cannot be altered.

Continuing with FIG. 2, terminal recovery enables the recovery operation to be repeated using the same set of redo log files 230, 232, 234 and standby database 218, and prevents terminal recovery using a different mix of redo log files 216 and databases with a different identification code 226, 228. If terminal recovery is started using the standby redo log file 220 and the standby database 216, terminal recovery could not be re-started using the primary redo log file 216 and files from the primary database 212.

If terminal recovery should fail before the identification code 228 is written to all standby redo log data files 230, 232, 234, a subsequent use of terminal recovery will use the previous identification code 228 from any redo log file configuration 220 being used with terminal recovery. If any redo data log files 230, 232, 234 have a non-zero identification code 228, the identification code 228 on all of the redo log data files 230, 232, 234 must all be identical for terminal recovery to continue.

Referring to FIG. 2, if the selected standby database 218 has an identification code 226, the identification code 226 must exactly match the identification code 228 in the standby redo log file configuration 220. While an exact match has been described, the present invention is not so limited, as identification codes can be considered matched without having the same record type or physical format, without departing from the broader aspects of the present invention. If the standby database 218 has a zero identification code 226, and the standby database 218 was cleanly checkpointed at the transaction number 236 in the identification code 228 in the standby redo log file configuration 220, the standby redo log file's identification code 228 will be written to the standby database 218. A checkpoint is a stamp indicating that all changes prior to the transaction number 236, 238, 240 specified by a redo record have been written to the database 212, 218. A standby database 218 that was cleanly checkpointed at the identification code's transaction number 236 is guaranteed identical with the primary database 212 as of the checkpointed transaction number 236, 238, 240. The use of terminal recovery for a standby database 218 that does not satisfy the above conditions will be rejected and terminal recovery will fail.

Figure 3:
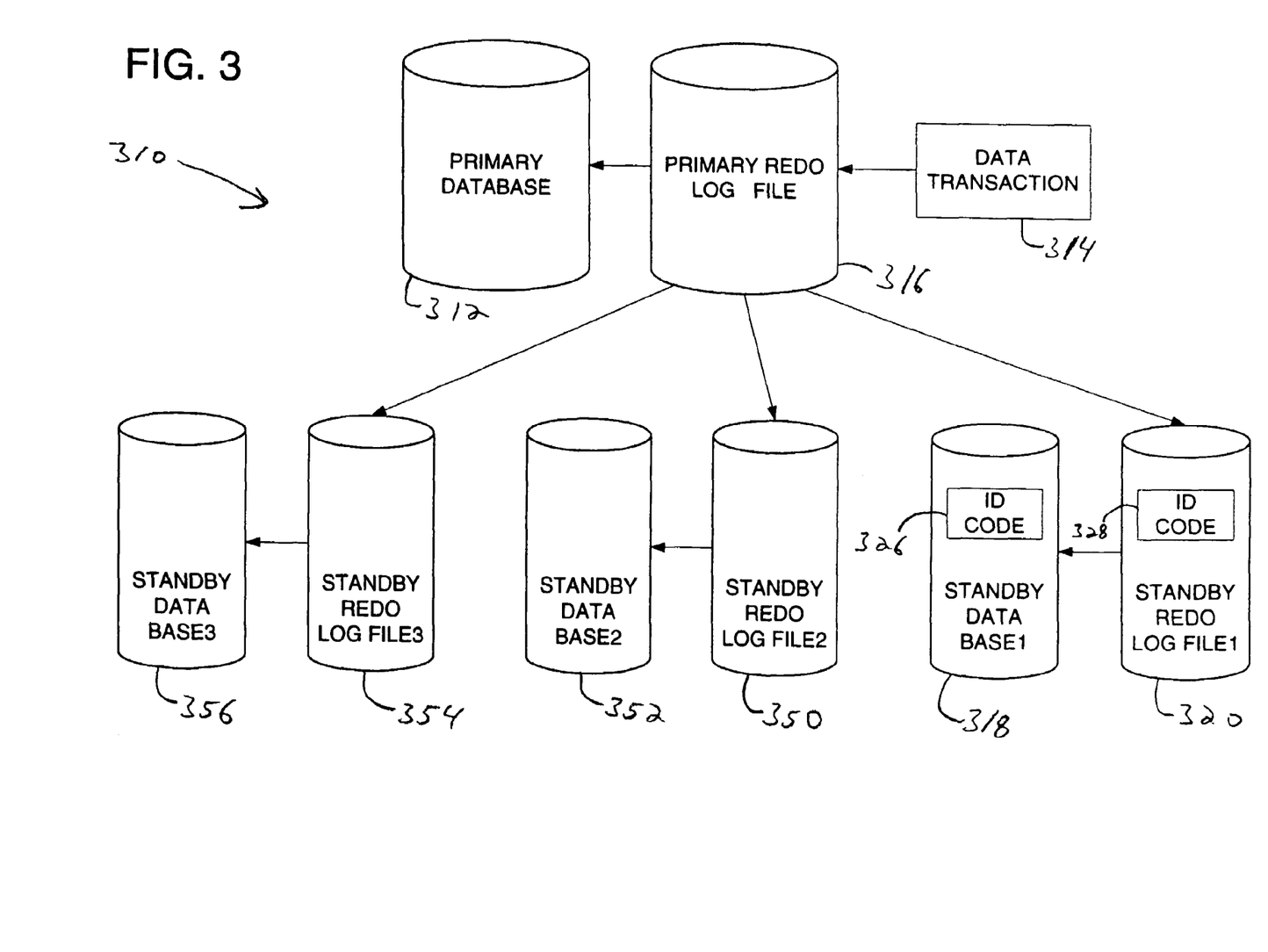
FIG. 3 is a block diagram of a third embodiment of a database system including a terminal recovery system.

FIG. 3 shows a database system 310 having multiple standby databases 318, 352, 356 and associated redo log files 320, 350, 354. Any one of the standby databases 318, 352, 356 can be selected to replace the primary database 312. The redo log file 316, 320, 350, 354 selected to update the selected standby database 318 can be chosen from among primary redo log file 316, standby redo log file1 320, standby redo log file2 350, and standby redo log file3 354. While three standby log files 320, 350, 354 and databases 318, 352, 356 have been shown and discussed, the present invention is not so limited, as a database system 310 can include any number of standby databases and associated standby log files, any of which can be selected for use with terminal recovery, without departing from the broader aspects of the present invention.

As shown in FIG. 3, a unique identification code 326 has been inserted in standby database1 318. The same identification code 328 has been recorded in standby redo log file1 320. Therefore, the standby database1 318 has been selected to replace the primary database 312, with the data transaction 314 redo updates being applied from standby redo log file1 320.

Figure 4:
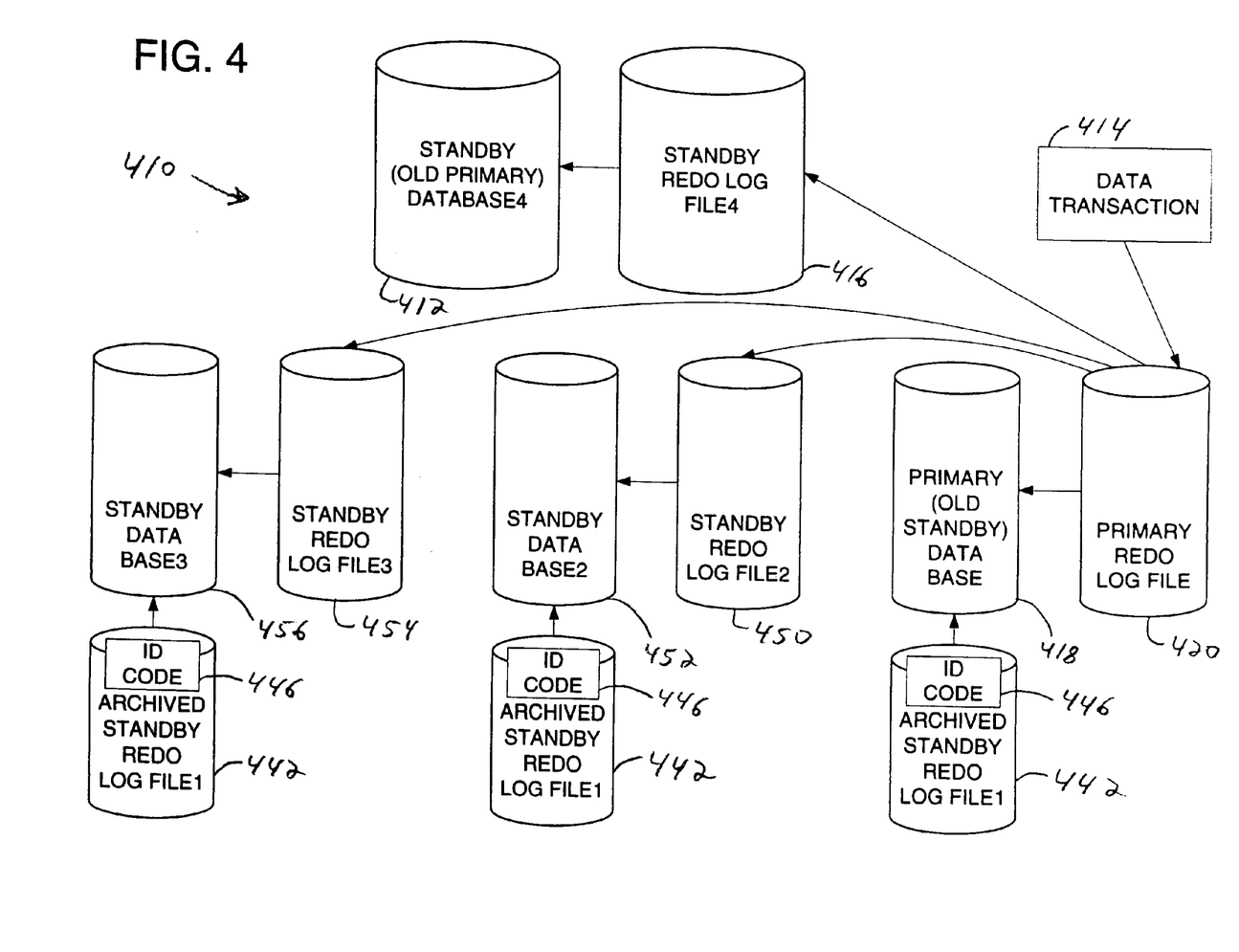
FIG. 4 is a block diagram of another embodiment of a database system after application of a terminal recovery system incorporating features of the present invention.

FIG. 4 shows a database system 410 after completion of one embodiment of the terminal recovery process of the present invention. In FIG. 4, a selected standby database 418 is updated, and a redo log file 420, including an identification code 446, is archived 442. Moreover, the updated standby database 418 is designated as the new primary database 418, the identification code (not shown) in the new primary database 418 is cleared, and a new online redo log file 420 associated with the new primary database 418 is begun.

At this point, other standby databases 452, 456 in the database system 410 can be recovered to a consistent state with the new primary database 418 and become standby databases 452, 456 of the new primary database 418. The archived redo log file 442, with the identification code 446, can be copied to the location of each of the standby databases 452, 456 in preparation for updating. Before the updating of the standby database 452, 456 is initiated, the identification code 446 in the archived redo log file 442 is compared with the identification code, if any, in the standby database 452, 456 to be updated.

Continuing with FIG. 4, if the standby database 452, 456 does not include an identification code, the identification code 446 from the archived redo log file 442 is inserted in the standby database 452, 456. The update process then continues as described above, and the standby database 452, 456 is updated to a state consistent with the new primary database 418. After the update is complete, the updated standby database 452, 456 can be used as a standby database 452, 456 for the new primary database 418.

Referring to FIG. 4, if the standby database 452, 456 includes an identification code (none shown) which does not match the identification code 446 of the archived redo log file 442, processing is halted. If the standby database 452, 456 includes an identification code (not shown) which was not cleared, the standby database 452, 456 has been involved in a previous terminal recovery which was not successful. Manual intervention is often required to evaluate the state of data transactions in the standby database 452, 456.

After completion of the update of the standby database 452, 456, further steps are required to include the standby database 452, 456 in the updated database system 410. Upon receipt of a data transaction 414 from the online redo log file 420 of the new primary database 418, the standby database 452, 456 is cleared of the identification code (not shown). A new online standby log file 450, 454 (without an identification code) is also created for receiving data transactions 414 to be applied to the new primary database 418, as well as to the standby database 452, 456.

Furthermore, assuming the old primary database 412 is not physically damaged and is available for use in the database system, the new primary database 418 can be copied to replace the old primary database 412. The old primary database 412 can be designated as a standby database 412 for the new primary database 418. Upon receipt of a data transaction 414, a new standby redo log file 416 will be created for the new standby database 412.

Figure 6:
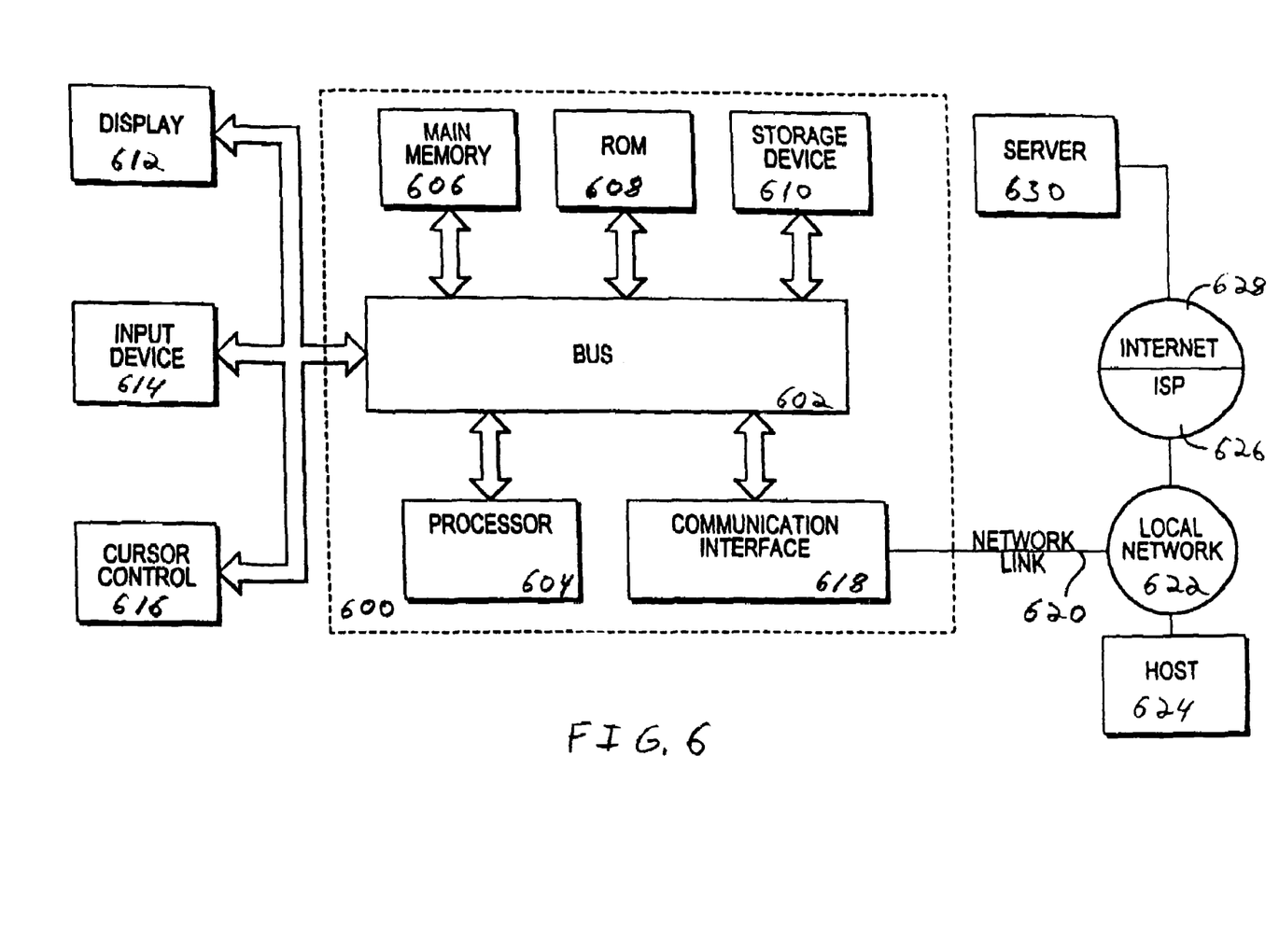
FIG. 6 is a block diagram illustrating a computer system on which embodiments of the invention may be implemented.

FIG. 6 is a block diagram that illustrates a computer system 600 upon which an embodiment of the invention may be implemented. The computer system 600 includes a bus 602 or other communication mechanism for communicating information, and a processor 604 coupled with bus 602 for processing information. The computer system 600 also includes a main memory 606, such as a random access memory (RAM) or other dynamic storage device, coupled to the bus 602 for storing information and instructions to be executed by the processor 604. The main memory 606 also may be used for storing temporary variables or other intermediate information during execution of instructions to be executed by the processor 604. The computer system 600 further includes a read only memory (ROM) 608 or other static storage device coupled to the bus 602 for storing static information and instructions for the processor 604. A storage device 610, such as a magnetic disk or optical disk, is provided and coupled to the bus 602 for storing information and instructions.

The computer system 600 may be coupled via bus 602 to a display 612, such as a cathode ray tube (CRT), for displaying information to a computer user. An input device 614, including alphanumeric and other keys, is coupled to the bus 602 for communicating information and command selections to the processor 604. Another type of user input device is cursor control 616, such as a mouse, a trackball, or cursor direction keys for communicating direction information and command selections to the processor 604 and for controlling cursor movement on the display 612. This input device typically has two degrees of freedom in two axes, a first axis (e.g., x) and a second axis (e.g., y), that allows the device to specify positions in a plane.

In one embodiment, the invention is related to the use of the computer system 600 for performing terminal recovery of a database during a failover. According to one embodiment of the invention, incremental refresh is performed by the computer system 600 in response to the processor 604 executing one or more sequences of one or more instructions contained in the main memory 606. Such instructions may be read into the main memory 606 from another computer-readable medium, such as the storage device 610. Execution of the sequences of instructions contained in the main memory 606 causes the processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to the processor 604 for execution. Such a medium may take many forms, including but not limited to, non-volatile media, volatile media, and transmission media. Non-volatile media includes, for example, optical or magnetic disks, such as the storage device 610. Volatile media includes dynamic memory, such as the main memory 606. Transmission media includes coaxial cables, copper wire and fiber optics, including the wires that comprise the bus 602. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying out one or more sequences of one or more instructions to the processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector coupled to appropriate circuitry can receive the data carried in the infra-red signal and place the data on the bus 602. The bus 602 carries the data to the main memory 606, from which the processor 604 retrieves and executes the instructions. The instructions received by the main memory 606 may optionally be stored on the storage device 610 either before or after execution by the processor 604.

The computer system 600 also includes a communication interface 618 coupled to the bus 602. The communication interface 618 provides a two-way data communication coupling to a network link 620 that is connected to a local network 622. For example, the communication interface 618 may be an integrated services digital network (ISDN) card or a modem to provide a data communication connection to a corresponding type of telephone line. As another example, the communication interface 618 may be a local area network (LAN) card to provide a data communication connection to a compatible LAN. Wireless links may also be implemented. In any such implementation, the communication interface 618 sends and receives electrical, electromagnetic or optical signals that carry digital data streams representing various types of information. The network link 620 typically provides data communication through one or more networks to other data devices. For example, the network link 620 may provide a connection through the local network 622 to a host computer 624 or to data equipment operated by an Internet Service Provider (ISP) 626. The ISP 626 in turn provides data communication services through the world wide packet data communication network now commonly referred to as the "Internet" 628. The local network 622 and the Internet 628 both use electrical, electromagnetic or optical signals that carry digital data streams. The communication interface 618 can carry the digital data to and from the computer system 600. The signals carried through the various networks, and the signals carried on the network link 620 and through the communication interface 618, are exemplary forms of carrier waves transporting the information.

The computer system 600 can send messages and receive data, including program code, through the network(s), the network link 620 and communication interface 618. In the Internet example, a server 630 might transmit a request code for an application program through the Internet 628, the ISP 626, the local network 622 and the communication interface 618. The received program code may be executed by the processor 604 as it is received, and/or stored in the storage device 610, or other non-volatile storage for later execution. In this manner, the computer system 600 may obtain application program code in the form of a carrier wave.

Terminal recovery of the present invention enhances the failover procedure by providing for more data integrity and more secure means of database recovery. Furthermore, performance is increased for existing database systems by avoiding manual recoveries, and therefore facilitating

What is claimed is:

1. A method comprising:
   selecting an operating database to replace a failed database during a failover operation and defining a point of recoverability in the operating database;
   selecting a log file to be applied to the operating database and tagging the selected log file with a recovery identifier corresponding to the point of recoverability to bind the selected log file to the selected operating database for the failover operation;
   applying data records from the selected log file to the operating database after verifying that a presence of the recovery identifier in the selected log file is consistent with a recovery identifier in the operating database;
   selecting another log file to be applied to the selected operating database;
   applying data records from the another log file if the another log file is tagged with the recovery identifier that is consistent with the recovery identifier in the selected operating database; and
   tagging the another log file with the recovery identifier from the selected operating database after the data records from the another log file are applied to the selected operating database, if the another log file did not have the recovery identifier prior to recovery operations.

2. The method of claim 1 wherein the recovery identifier of the another log file is consistent with the recovery identifier of the selected operating database if the recovery identifier of the another log file matches the recovery identifier in the selected operating database or matches a prior identifier from the failed database stored in the selected operating database prior to the failover operation.

3. The method of claim 1 further comprising, after selecting the operating database:
   tagging the selected database with an identifier; and
   tagging the selected log file with the identifier to associate the selected log file with the selected database.

4. The method of claim 1 further comprising that the selected log file is remotely located from the operating database.

5. A method comprising:
   selecting an operating database to replace a failed database during a failover operation;
   selecting a log file to be applied to the operating database;
   applying data records from the selected log file to the operating database after verifying that a presence of a recovery identifier in the selected log file is consistent with a recovery identifier in the operating database;

archiving the selected log file with the recovery identifier; and applying data records from the archived log file to another standby database only if a recovery identifier in the another standby database is consistent with the recovery identifier in the archived log file.

6. The method of claim 5 further comprising, if the another standby database is not tagged with a recovery identifier, tagging the another standby database with the recovery identifier stored in the archived log file.

7. The method of claim 5 further comprising, if the another standby database is tagged with a recovery identifier that is different from the recovery identifier in the archived log file, halting the recovery process.

8. The method of claim 5 further comprising, after selecting the operating database to replace the failed database:

defining a point of recoverability in the operating database; and tagging the selected log file with the recovery identifier corresponding to the point of recoverability to bind the selected log file to the selected operating database for the failover operation.

9. A method comprising:

selecting an operating database to replace a failed database during a failover operation;

selecting a log file to be applied to the operating database;

applying data records from the selected log file to the operating database after verifying that a recovery identifier in the selected log file is consistent with a recovery identifier in the operating database; and after all data records from the selected log file are applied to the selected operating database, converting the selected operating database to replace the failed database, clearing the recovery identifier from the converted database, and applying a new identifier to the converted database that will be applied to all log files to be bound to the converted database.

10. The method of claim 9 further comprising, after selecting the operating database to replace the failed database:

defining a point of recoverability in the operating database; and tagging the selected log file with the recovery identifier corresponding to the point of recoverability to bind the selected log file to the selected operating database for the failover operation.

11. The method of claim 9 further comprising:

selecting another log file to be applied to the selected operating database;

applying data records from the another log file if the another log file is tagged with the recovery identifier that is consistent with the recovery identifier defined in the selected operating database.

12. The method of claim 11 wherein the recovery identifier of the another log file is consistent with the recovery identifier of the selected operating database if the recovery identifier of the another log file matches the recovery identifier in the selected operating database or matches a prior identifier from the failed database stored in the selected operating database prior to the failover operation.

13. A method comprising:

in response to a failure of a primary database, selecting a standby database to replace the primary database during a recovery process;

applying any unrecovered complete log files to the selected standby database;

generate a terminal recovery stamp and apply the stamp to the selected standby database and at least one log file to be used in the recovery process;

applying data records to the selected standby database to bring the standby database to a consistent data level only if the log file associated with the data records includes the terminal recovery stamp; and archiving the log file with the terminal recovery stamp after all data records have been applied to the standby database, converting the standby database to a new primary database, and updating other standby databases using the archived log file when the other standby databases have a terminal recovery stamp that matches the terminal recovery stamp of the archived log file or do not have a terminal recovery stamp.

14. The method of claim 13 further comprising, prior to applying a data record from the selected log file to the standby database:

comparing the terminal recovery stamp from the standby database with a terminal recovery stamp of the data record; and applying the data record to the standby database of the comparison is a match.

15. The method of claim 13 further comprising:

selecting another database to be recovered to a state of the standby database;

determining if the another database has a terminal recovery stamp;

applying the terminal recovery stamp of the log file to the another database if the another database does not have a terminal recovery stamp prior to applying any data records from the log file to the another standby database;

halting the recovery process if a non-zero terminal recovery stamp exists in the another standby database that does not match the terminal recovery stamp in the log file.

16. The method of claim 13 further comprising, if the another standby database does not have a terminal recovery stamp, determining if all transactions prior to a transaction identifier corresponding to the terminal recovery stamp of the log file were checkpointed, and if so, writing the terminal recovery stamp of the log file to the another standby database.

17. The method of claim 13 wherein the terminal recovery stamp comprises a lowest transaction identifier of the log file and a current time stamp.

18. The method of claim 13 wherein the terminal recovery stamp does not include a time stamp entry.

19. The method of claim 13 further comprising that all data received in the selected log file is applied to the operating database after verifying the presence of the recovery identifier.

20. A method comprising:

in response to a failure of a primary database, selecting a standby database to replace the primary database during a recovery process;

applying any unrecovered complete log files to the selected standby database;

generate a terminal recovery stamp and apply the stamp to the selected standby database and at least one log file to be used in the recovery process;

applying data records to the selected standby database to bring the standby database to a consistent data level only if the log file associated with the data records includes the terminal recovery stamp;

selecting another database to be recovered to a state of the standby database;

determining if the another database has a terminal recovery stamp;

applying the terminal recovery stamp of the log file to the another database if the another database does not have a terminal recovery stamp prior to applying any data records from the log tile to the another standby database;

halting the recovery process if a non-zero terminal recovery stamp exists in the another standby database that does not match the terminal recovery stamp in the log file.

21. The method of claim 20 further comprising, prior to applying a data record from the selected log file to the standby database:

comparing the terminal recovery stamp from the standby database with a terminal recovery stamp of the data record; and applying the data record to the standby database of the comparison is a match.

* * * * *

UNITED STATES PATENT AND TRADEMARK OFFICE
CERTIFICATE OF CORRECTION

PATENT NO. : 7,437,609 B2  Page 1 of 1
APPLICATION NO. : 11/325082
DATED : October 14, 2008
INVENTOR(S) : Anderson, Jr. et al.

It is certified that error appears in the above-identified patent and that said Letters Patent is hereby corrected as shown below:

In column 1, line 35-58, delete "quicker failover. Terminal recovery of the present invention can overcome the loss of data integrity in a primary database caused by an apparent failure of the primary database, and can provide a deterministic standby database recovery solution in the event of failure of the primary database. Terminal recovery can be applied to any product providing a disaster recovery solution utilizing a standby database which needs to guarantee reliable and consistent fail-over methodologies. This includes many database systems having standby databases and disaster recovery products.
In one embodiment of terminal recovery, separate steps for applying terminal recovery have been shown. In another embodiment, terminal recovery automatically creates, records and inserts a unique identification code 226, 228 in the appropriate files, updates the standby database 220, and creates an archived redo log file 242 after an instruction to initiate terminal recovery is issued by a user.
It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims." and insert the same on Col. 12, Line 20, after "facilitating" as a continuation of the same paragraph.

In column 8, line 46, delete "216," and insert -- 218, --, therefor.

In column 15, line 6, in Claim 20, delete "tile" and insert -- file --, therefor.

Signed and Sealed this

Thirteenth Day of April, 2010

David J. Kappos
*Director of the United States Patent and Trademark Office*